A. S. NEWTON.
DOOR BUFFER.
APPLICATION FILED AUG. 12, 1912.
1,044,412.
Patented Nov. 12, 1912.
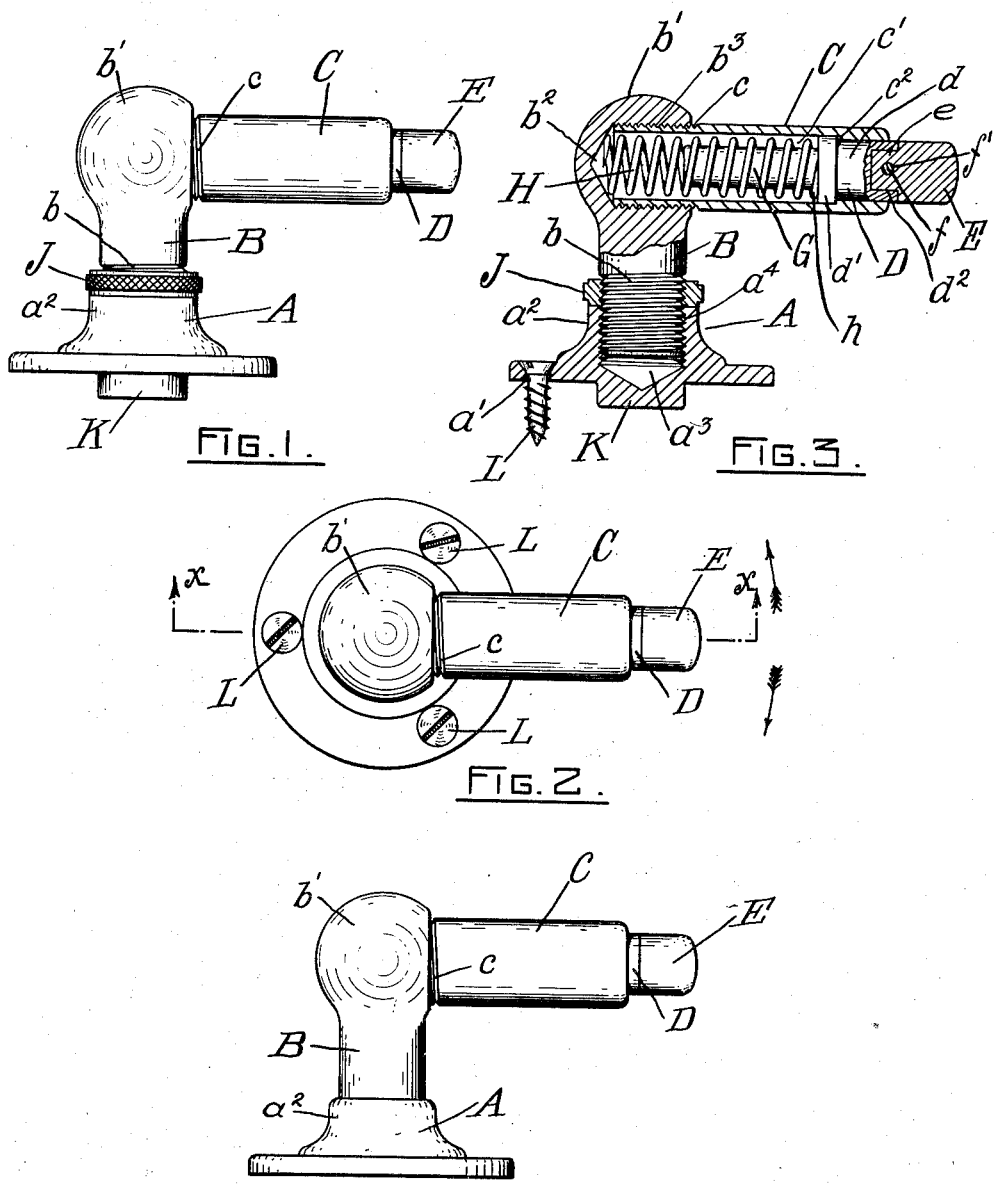
WITNESSES.
Albert G. Piegenthowski
Marguerite H. Livsey
INVENTOR.
Albert S. Newton
By Horatio E. Bellows
ATTORNEY.

UNITED STATES PATENT OFFICE.

ALBERT S. NEWTON, OF PROVIDENCE, RHODE ISLAND.

DOOR-BUFFER.

1,044,412.　　　　　Specification of Letters Patent.　　Patented Nov. 12, 1912.

Application filed August 12, 1912. Serial No. 714,585.

*To all whom it may concern:*

Be it known that I, ALBERT S. NEWTON, a citizen of the United States, residing at Providence, in the county of Providence and State of Rhode Island, have invented certain new and useful Improvements in Door-Buffers, of which the following is a specification.

My invention relates to a buffer for doors, blinds and other swinging objects.

The purposes of my invention are to render the structure available for this object in any location relatively to the door, and especially where it is impracticable to locate the same upon a wall, but rather upon a floor or other surface lying in a plane at right angles to the plane of the wall; also to render the buffer capable of adjustment to receive the impact of the swinging object on its axial line regardless of the relative location of the parts; to afford an adjustment of the tension of the spring, and finally to relieve the strain upon the retaining screws.

To the above ends essentially my invention consists in such parts and such combinations of parts as fall within the scope of the appended claims.

In the accompanying drawings which form a part of this specification, Figures 1 and 2 are side and plan elevations respectively of my novel device, Fig. 3 a section of the same on line $x$ $x$ of Fig. 2, and Fig. 4, a side elevation of a modified form of my invention.

Like reference characters indicate like parts throughout the views.

My device in its approved form consists of a base A provided with perforations $a'$ to receive fastening screws, and a vertical portion $a^2$ provided with a central vertical opening $a^3$ having threads $a^4$.

A post B is provided upon its exterior lower portion with threads $b$ adapted to engage the threads $a^4$ of the base, and is provided with an enlarged head portion $b'$ which has a horizontally disposed opening $b^2$ provided with threads $b^3$. A horizontal tubular arm C has exterior threads $c$ upon one end which engage the threads $b^3$ of the post. A portion of the interior of the tube, as at $c'$, is of enlarged diameter and forms an internal annular shoulder $c^2$ near its outer end. A plunger member D is slidably mounted in the arm C and in detail comprises a head $d$ having an annular collar $d'$ and a central cut away portion $d^2$ adapted to receive the reduced portion $e$ of the rubber facing or plug portion of the head E. The latter member is preferably of soft rubber, but any other relatively soft material may be employed. This member may be engaged with the remaining portion of the head $d$ by friction or by a transversely disposed pin $f$ passing through an opening $f'$ in the portion E and having its ends riveted in the head $d$. The body or shank of the plunger G extends nearly to the end of the arm C and is surrounded by a helical spring H which has one end $h$ abutting against the back of the head $d$, and its other end abutting against the head $b'$ at the end of the opening $b^2$. This spring pressing against the rear of the head $d$ normally retains the collar $d'$ against the shoulder $c^2$. A locking nut J has its interior threads $j$ engaging the threads $b$ of the post and is normally in contact with the upper edge of the portion $a^2$ of the base.

Concentric with the bottom of the base A is a cylindrical projection K. And retaining screws L enter the opening $a'$ of the base. The projection K is adapted to enter an opening in the floor and form a brace against repeated blows upon the upper portion of my device, thus easing the strain upon the retaining screws L. The extension K may, however, be omitted if desired.

In Fig. 4 is shown a structure wherein this member is omitted, and wherein the post B is integral with the base A, and wherein for obvious reasons the check nut J is absent. The integral construction of the post and base lacks one important advantage present in the form of structure shown in Figs. 1 and 2. In the latter construction it will be observed that the arm C may be swung in the direction of either of the arrows shown in Fig. 2, thus locking the arm in any required position in a horizontal plane to best adapt the member E to meet the impact of the swinging object squarely. This adjustment is attained by virtue of the threaded connection of the post and base, and after swinging the post or arm C to the desired position the nut J is turned down to lock the parts in the adjusted position.

The threaded connections $c$ and $b^3$ permit the arm C to be moved outwardly and inwardly relatively to the head $b'$, thus making it possible to vary the pressure of the spring H, whenever the weight of the swinging object varies, or to compensate for any weakness that may occur in the spring after continued use.

The right angular relation of the arm C to the post B makes it possible to utilize the device upon a floor or upon a surface right angularly disposed to the face of the swinging object and hence is available in many places where the usual buffer is unavailable.

I claim:—

1. In a device of the type set forth, the combination with a base of a post mounted in the base, an arm in the post extending at right angles to the post, and a plunger yieldingly mounted in the arm.

2. In a device of the type set forth, the combination of a base, a post upon the base, an arm adjustably mounted in the post at right angles to the post, and a plunger yieldingly mounted in the arm.

3. In a device of the type set forth, the combination with a base and post, said post being provided with a threaded opening disposed at right angles to the post, of a tubular arm provided with threads engaging in the threaded opening, a plunger slidably mounted in the arm comprising a head projecting from the arm, and a shank within the arm and resilient means within the arm pressing against the head.

4. In a device of the type set forth, the combination of a base provided with a vertically disposed threaded opening, a post provided with external threads engaging the threaded opening, and an arm horizontally disposed with relation to the post adjustably mounted in the post.

5. In a device of the type set forth, the combination of a base comprising a flat portion provided with openings and a depending projection upon the flat portion, and an upright portion provided with a vertical opening having interior threads, a post provided upon its lower portion with external threads adapted to loosely engage the threads in the base, and a horizontal arm adjustably mounted in the upper portion of the post.

In testimony whereof I have affixed my signature in presence of two witnesses.

ALBERT S. NEWTON.

Witnesses:
   HORATIO E. BELLOWS,
   FRED W. PERKINS.